United States Patent
Corbeil et al.

(10) Patent No.: US 10,486,539 B2
(45) Date of Patent: Nov. 26, 2019

(54) CHARGE DEMAND CONTROLLER DEVICE

(71) Applicants: RECHARGE VEHICULE ELECTRIQUE INC., Laval (CA); THERMOLEC LTEE, Montréal (CA)

(72) Inventors: David Corbeil, Laval (CA); Chérif Menassa, Hudson (CA)

(73) Assignees: RECHARGE VEHICULE ELECTRIQUE INC., Laval, QC (CA); THERMOLEC LTEE, Montreal, QC (CA)

( * ) Notice: Subject to any disclaimer, the term of this patent is extended or adjusted under 35 U.S.C. 154(b) by 165 days.

(21) Appl. No.: 15/671,179

(22) Filed: Aug. 8, 2017

(65) Prior Publication Data

US 2018/0043786 A1 Feb. 15, 2018

Related U.S. Application Data

(60) Provisional application No. 62/372,779, filed on Aug. 9, 2016.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| B60L 11/18 | (2006.01) |

(Continued)

(52) U.S. Cl.
CPC ........... *B60L 11/1824* (2013.01); *B60L 53/14* (2019.02); *B60L 53/30* (2019.02); *B60L 53/63* (2019.02); *B60L 58/12* (2019.02); *H02J 3/14* (2013.01); *H02J 7/0021* (2013.01); *H02J 7/0027* (2013.01); *H02J 7/0068* (2013.01); *H02J 7/02* (2013.01); *Y02B 70/3225* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 20/222* (2013.01); *Y04S 30/12* (2013.01)

(58) Field of Classification Search
None
See application file for complete search history.

(56) References Cited

U.S. PATENT DOCUMENTS

| | | | |
|---|---|---|---|
| 2011/0216451 A1* | 9/2011 | Haines | B60L 3/0069 361/42 |
| 2012/0245751 A1* | 9/2012 | Gow | H02J 3/14 700/291 |

(Continued)

*Primary Examiner* — Ziaul Karim
(74) *Attorney, Agent, or Firm* — Praxis

(57) ABSTRACT

A charge demand controller device for electric vehicles or the like, preferably for installation with an existing residential electrical control panel, connects between a main switch and the electrical control panel made to operate at a maximum amperage value. The device includes a controller unit that constantly monitors an actual total load current at the input line connector from the main switch, and selectively operates a load switch controlling an electric vehicle supply equipment (EVSE) upon the actual total load current being above or below a trip value being a predetermined safety ratio of the maximum amperage value.

13 Claims, 3 Drawing Sheets

(51) Int. Cl.
  *H02J 7/00* (2006.01)
  *H02J 3/14* (2006.01)
  *B60L 53/14* (2019.01)
  *B60L 53/30* (2019.01)
  *B60L 53/63* (2019.01)
  *B60L 58/12* (2019.01)
  *H02J 7/02* (2016.01)

(56) References Cited

U.S. PATENT DOCUMENTS

| | | | |
|---|---|---|---|
| 2012/0271576 A1* | 10/2012 | Kamel | H02J 13/0006 702/62 |
| 2012/0286729 A1* | 11/2012 | Yegin | B60L 3/0069 320/109 |
| 2015/0120109 A1* | 4/2015 | Cun | B60W 20/00 701/22 |
| 2015/0316944 A1 | 11/2015 | Thellend | |
| 2017/0324195 A1* | 11/2017 | Eriksen | H02H 3/00 |

\* cited by examiner

CHARGE DEMAND CONTROLLER DEVICE

CROSS-REFERENCE TO RELATED APPLICATIONS

This application claims priority of U.S. Provisional Application for Patent No. 62/372,779 filed Aug. 9, 2016, the content of which is incorporated herein by reference in its entirety.

FIELD OF THE INVENTION

The present invention relates generally to electrical controller devices, and more particularly to charge demand controller device for electric vehicles or the like, preferably for installation with existing residential electrical control panels, or more formally distribution or circuit breaker panels, which each includes a conventional fuse box or power source and a switch box (with conventional power circuit breakers).

BACKGROUND OF THE INVENTION

It is well known in the art of electric vehicles to implement stations for the charging of electrical vehicle, usually referred to as an electric vehicle supply equipment (EVSE). However, in residential areas, the utility grid is not always well made to easily include the installation of such a charging station like an EVSE or the like. Also, the time required to recharge a battery system of an electric vehicle is proportional to the amperage and voltage available from the utility grid and/or the corresponding electrical control panel, or simply electrical panel or control panel.

For example, old electrical installations, and even new ones such as in condominiums and the like, may be limited to the maximum total amperage the electrical control panel can distribute (such as 100 A or less at either 120 or 240 VAC), leaving almost nothing such that such an EVSE cannot be installed, thus requiring the utility providing company to come and upgrade an existing electrical control panel or install a second electrical control panel dedicated to the EVSE charging station, which is relatively expensive. On the other hand, when the total power consumption on the main power line gets significantly lower than the maximum allowed, for certain periods of time such as overnight and the like, available power could be used for an EVSE station.

Alternatively, when the electrical control panel have sufficient amperage and still have the possibility to install additional breakers or the like for directing a dedicated line to a charging station, the location of such panel (distance relative to the car parking zone) render the installation of the charging station relatively expensive again. Also, in some situations, there is even a combination of the above two scenarios.

Accordingly, there is a need for an improved charge demand controller device for electric vehicle or the like.

SUMMARY OF THE INVENTION

It is therefore a general object of the present invention to provide an improved charge demand controller device for electric vehicle or the like, that substantially solve the above-mentioned problems and drawbacks.

An advantage of the present invention is that the charge demand controller device can be installed on any existing main power line, and even upstream of the corresponding electrical control panel, and typically downstream of the main switch usually inside the utility service box.

Another advantage of the present invention is that the charge demand controller device, via constant monitoring of the power consumption by the corresponding electrical control panel (of the preferred load), will provide power to the charging or EVSE station (less preferred load) only when there is available power.

Yet another advantage of the present invention is that the charge demand controller device can be physically installed where the main power line runs without any additional junction boxes or the like, thus requiring a relatively easy installation with a short installation time and less hardware in order to be the less expensive as possible.

A further advantage of the present invention is that the charge demand controller device can also be used as an electrical control panel for the less preferred load of the EVSE, on the main power line.

Another advantage of the present invention is that the charge demand controller device can allow customization of different parameters, such as the circuit breaker amperage of the main power line (for the preferred load), a trip delay duration of a predetermined power consumption duration on the main line, a time delay duration before allowing power delivery to the EVSE again, and/or a maximum charge load amperage to the EVSE.

Yet a further advantage of the present invention is that the charge demand controller device can allow customization of a circuit breaker amperage of the less preferred load.

According to an aspect of the present invention there is provided a charge demand controller device for an electric vehicle for connecting between a main switch and an electrical panel made to operate at a maximum amperage value (MA), said device comprising:
  a box unit for mounting on a surface and having an input line connector for electrical connection with the main switch, an output line connector for connection with the electrical panel, and an output load connector for connection with an electric vehicle supply equipment (EVSE) external load, the output load connector electrically connecting to the input line connector via a load switch; and
  a controller unit mounting in the box unit and connecting to the input line connector and the output load connector, the controller unit constantly monitoring an actual total load current (L) at the input line connector, and selectively operating the load switch upon the actual total load current (L) being above or below a trip value (T) being a predetermined safety ratio (R) of the maximum amperage value (MA).

In one embodiment, the device further includes a switch contactor coil electrically connected to the controller unit and operatively connected to the load switch.

Conveniently, the controller unit includes a predetermined trip delay value (TD), the controller unit switching off the load switch upon the actual total load current (L) remaining above the trip value (T) for a trip time duration (TT) being equal to or larger than the predetermined trip delay value (TD).

Conveniently, the controller unit includes a predetermined off delay value (OD) and a maximum load charge value (MC) of the device, the controller unit switching back on the load switch upon the actual total load current (L) remaining below the trip value (T) minus the maximum load charge value (MC) for an actual off time duration (OT) being equal to or larger than the predetermined off delay value (OD).

Conveniently, wherein, while the actual off time duration (OT) is smaller than the predetermined off delay value (OD) and upon the actual total load current (L) getting equal or larger than the trip value (T) minus the maximum load charge value (MC), the controller unit verifying that the actual total load current (L) remains equal or larger than the trip value (T) minus the maximum load charge value (MC) for a trip time duration (TT) being equal to or larger than the predetermined trip delay value (TD) to allow turning back on the load switch, and, if not, to keep the load switch off and resume comparing the actual off time duration (OT) with the predetermined off delay value (OD) until the actual off time duration (OT) is equal to or larger than the predetermined off delay value (OD) before allowing turning back on the load switch or keeping the load switch off upon the actual total load current (L) remaining above the trip value (T) minus the maximum load charge value (MC) for another actual off time duration (OT) being equal to or larger than the predetermined off delay value (OD).

Typically, the device further includes an input unit electrically connected to the controller unit, the input unit transmitting at least one operating value received from an operator to the controller unit, a first one of the at least one operating value being the maximum amperage value (MA), a second one of the at least one operating value being the predetermined trip delay value (TD), a third one of the at least one operating value being the maximum load charge value (MC), and a fourth one of the at least one operating value being the predetermined off delay value (OD).

Conveniently, a fifth one of the at least one operating value being the predetermined safety ratio (R).

In one embodiment, the controller unit includes a modulator unit electrically connected between the input line connector and the load switch, the modulator unit modulating a load charge power reaching the output load connector depending on the actual total load current (L).

Conveniently, the modulator unit ensures that the actual total load current (L) does not exceed the trip value (T) for more than the predetermined trip delay value (TD).

In one embodiment, the controller unit includes at least one current sensor electrically connected to the input line connector to determine the actual total load current (L) running there through.

Conveniently, the input line connector connects to a plurality of power lines connecting to the main switch, the controller unit including one of the at least one current sensor electrically connected to each one of the plurality of power lines. And preferably, the controller unit determines the actual total load current (L) being the largest one of the current measured by the at least one current sensor.

Conveniently, the predetermined safety ratio (R) is about 80% of the maximum amperage value (MA).

In one embodiment, the controller unit automatically turns off the load switch upon the actual total load current (L) being a load upper limit (UL) below the maximum amperage value (MA).

Conveniently, the load upper limit (UL) is about 90% of the maximum amperage value (MA).

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

With reference to the annexed drawings the preferred embodiment of the present invention will be herein described for indicative purpose and by no means as of limitation.

Figure 1:
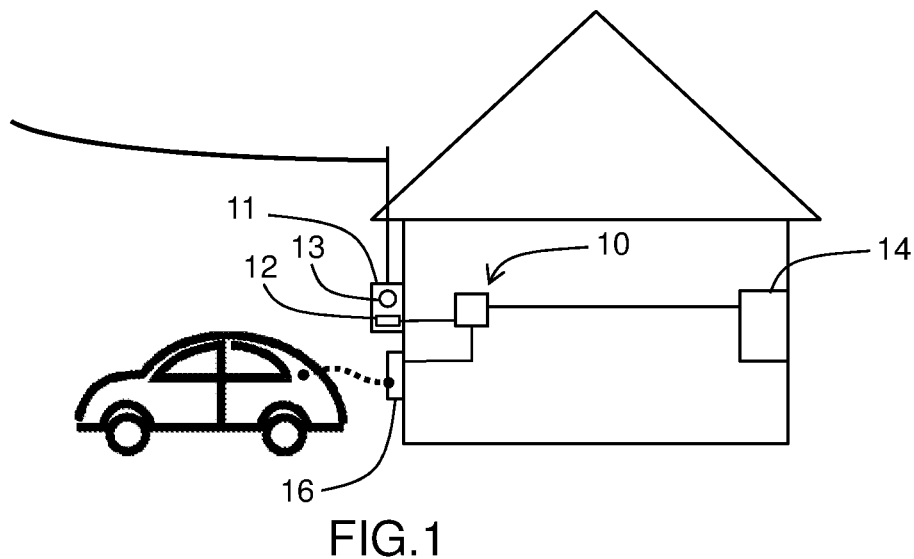
FIG. 1 is a schematic view of a typical installation of a charge demand controller device in accordance with an embodiment of the present invention, connecting between a main switch and an electrical control panel.

Referring to FIGS. 1 to 4, there is shown a charge demand controller device 10 in accordance with an embodiment of the present invention for connecting between an electrical control panel 14, or simply electrical panel which includes a conventional fuse box or power source and a switch box, and a main switch 12 typically directly coming from a conventional utility meter 13 and typically found in the utility service box 11, as illustrated in FIG. 1. Although the device 10 can be used to control the charge demand for different external loads, the following description will more specifically refer to the example of a charge demand controller device 10 for which the external load is an electric vehicle supply equipment (EVSE) 16 or the like. The controller device 10 of the present invention, once installed, is typically a stand-alone device that does not specifically need to communicate with external devices, via connectors or wirelessly, for its operation. Notwithstanding the above, the controller device 10 could also be in communication with external device(s) without departing from the scope of the present invention. As usually done for such controllers, the device 10 is powered by the electricity coming from the main switch 12, via a dedicated transformer (not shown) or the like.

Figure 2:
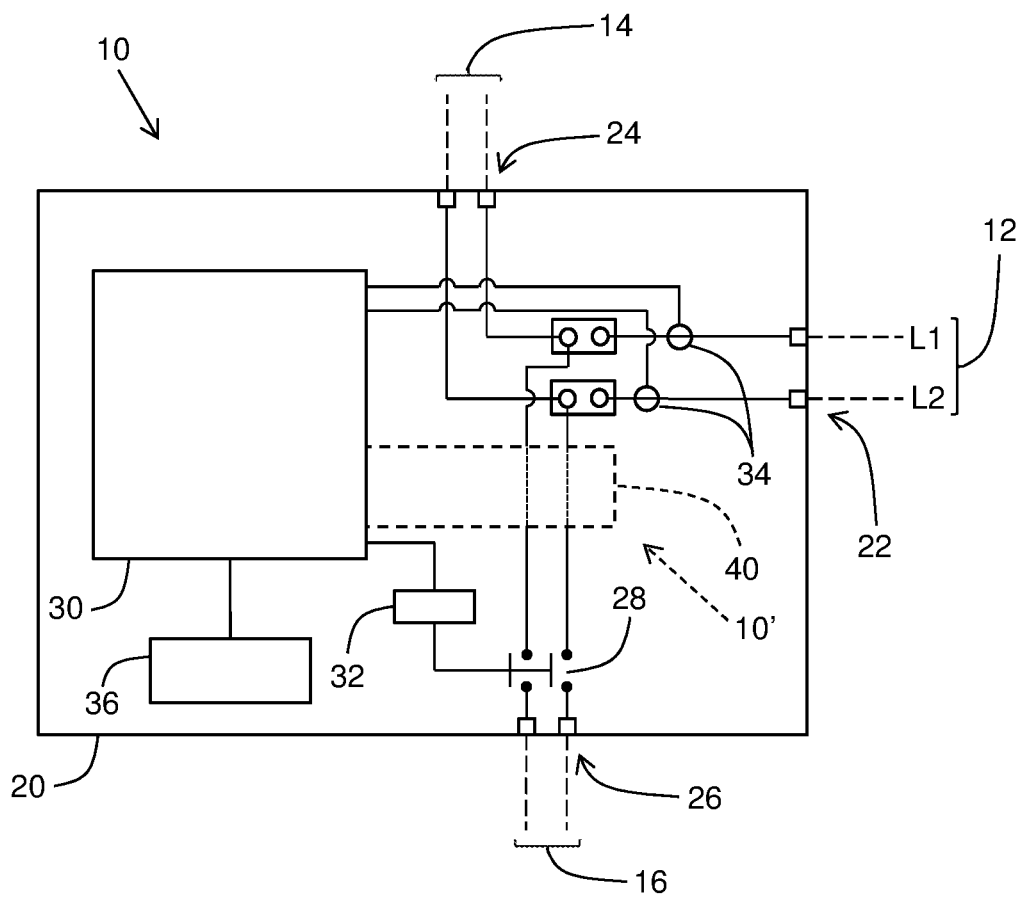
FIG. 2 is an electric schematic of the charge demand controller device of FIG. 1.

As shown in FIG. 2, the embodiment 10 typically includes a box unit 20 for mounting on a surface of a building wall or ceiling and having an input line connector 22 for electrical connection with the main switch 12. Similarly, the device 10 also includes an output line connector 24 for electrical connection with the electrical panel 14 (also referred to as the preferred load), and an output load connector 26 for electrical connection with an external load such as the EVSE 16 (also referred to as the less preferred load). The output load connector 26 typically electrically connects to the input line connector 22 via a load switch 28 or the like.

A controller unit 30 typically mounts in the box unit 20 and connects to the input line connector 22 and the output load connector 26. Typically, the controller unit 30 constantly monitors an actual (real time) total load current L at the input line connector 22, and selectively operates the load switch 28 upon the actual total load current L being above or below a trip value T being a predetermined safety ratio R, typically 80% according to building codes or the like, of the maximum amperage value MA of the main electric line running through the device 10 and typically being the value of the main circuit breaker of the electrical panel 14.

Typically, a switch contactor coil 32 electrically connects to the controller unit 30 and operatively connects to the 'mechanical' load switch 28 for operation thereof.

Figure 3:
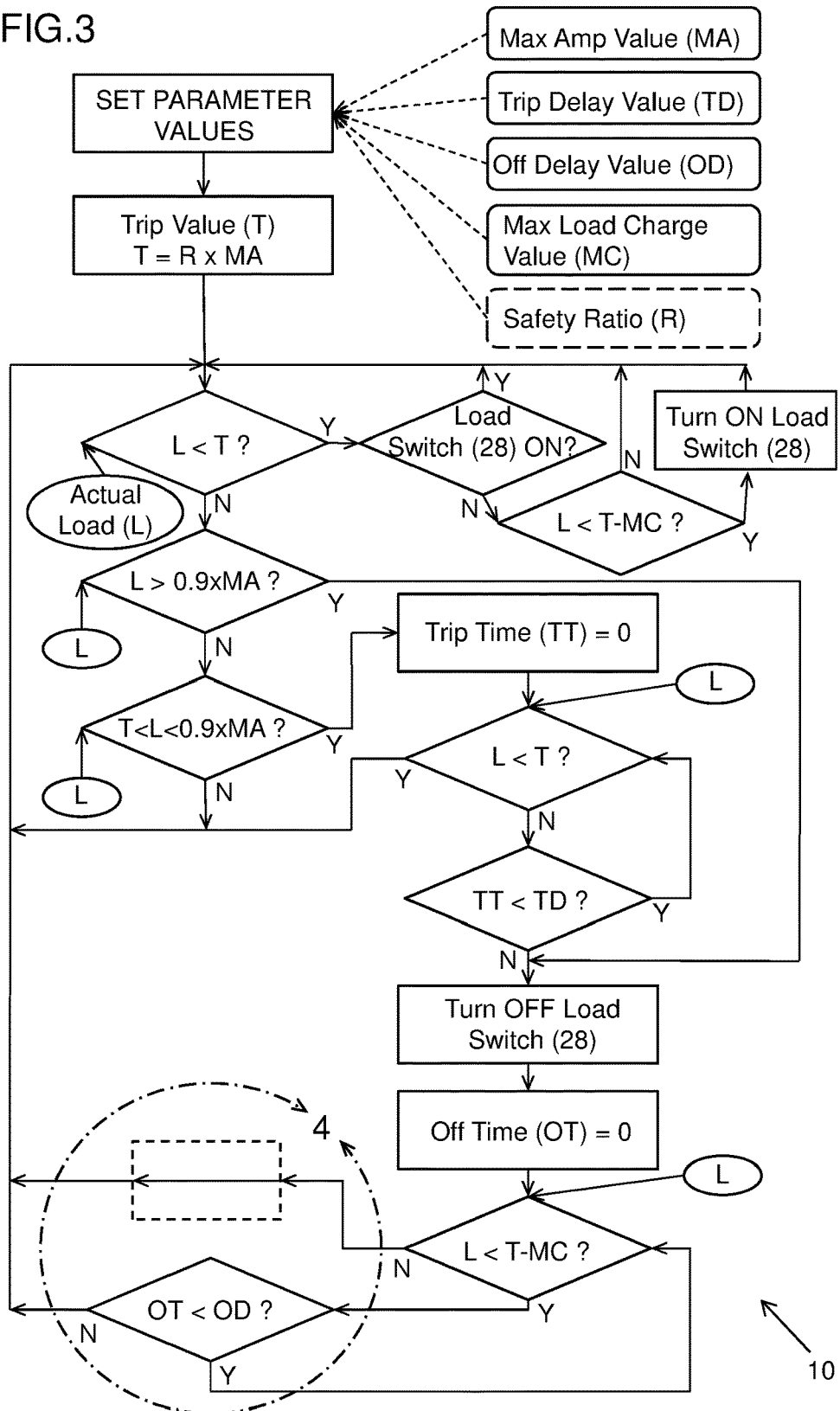
FIG. 3 is an operational block diagram of the charge demand controller device of FIG. 1.

For operation, as shown in the block diagram of FIG. 3, the controller unit 30 typically includes a predetermined trip delay value TD used in a trip loop of the block diagram. The controller unit 30 typically switches off the load switch 28 powering the EVSE 16 when the actual total load current L remains above the trip value T for a trip time duration TT being equal to or larger than a predetermined trip delay value TD, typically less than 20 seconds or the like, provided to the controller unit 30.

Typically, the controller unit 30 switches back on the load switch 28 after the actual total load current L, shown in an off-time loop of the block diagram, remained below the trip value T minus a maximum load charge value MC of the EVSE 16, typically varying between 12 A and 48 A or the like, for an actual off time duration OT that is equal to or larger than a predetermined off delay value OD, typically selected between 15 minutes and two (2) hours, and preferably about 15 minutes.

If, during the off-time loop, the actual total load current L reaches more than the trip value T minus the maximum load charge value MC upon the continuous monitoring by the controller unit 30, the controller unit 30 restarts the main checking loop in which the load switch 28 can be turned back on.

Figure 4:
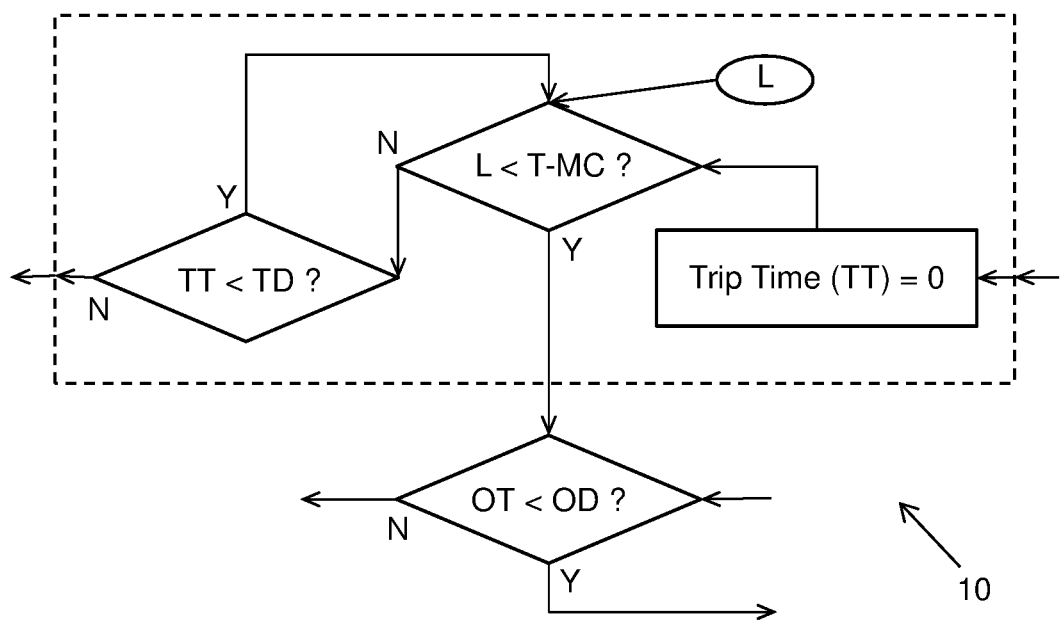
FIG. 4 is a view taken along line 4 of FIG. 3, showing a preferred embodiment at a specific location in the operational block diagram of the charge demand controller device.

Preferably, as illustrated in FIG. 4, if during the off-time loop, the actual total load current L reaches more than the trip value T minus the maximum load charge value MC upon the continuous monitoring by the controller unit 30, the controller unit 30 verifies that this latter condition remains for a trip time duration TT exceeding the predetermined trip delay value TD before restarting the main checking loop. Otherwise, if this latter condition is detected to be simply temporarily (for a duration less than the predetermined trip delay value TD), the controller unit 30 simply resumes the off time loop with the same actual off time duration OT the loop was interrupted at.

In order to allow specific customization of the controller device 10, the different parameters or operating values such as, the maximum amperage value MA, the predetermined trip delay value TD, the maximum load charge value MC, the predetermined off delay value OD, and/or the predetermined ratio R (80%), could be provided by a user/operator entering them via an input unit 36, such as an input panel, DIP (Dual In-line Package) switches or the like electrically connected to the controller unit 30.

Typically, when the device 10 is turned off, just before turning on the power to the EVSE 16, the controller unit 30 continuously verifies that the actual total load current L is less than the trip value T minus the maximum load charge value MC of the EVSE 16 to ensure that there is sufficient available power.

Typically, when the device 10 is turned on, just after turning on the power to the EVSE 16, the controller unit 30 verifies the actual total load current L. If the latter L is larger than a load upper limit (UL) of about typically 90% (as illustrated in the embodiment of FIG. 3) of the maximum amperage value MA (or any other predetermined value between 80% and 100%), the controller unit 30 automatically turns back off the power to the EVSE 16 and starts the actual off time duration OT. If not, the controller unit 30 checks if the actual total load current L is larger than the trip value T for a duration larger than the predetermined trip delay value TD. In such a case, the controller unit 30 turns off the power to the EVSE 16, and in the opposite, the EVSE 16 remains powered while the controller unit 30 restarts the main checking loop.

In order to monitor the actual total load current L running through the main line coming from the main switch 12, the controller unit 30 includes at least one, and typically one current sensor 34 electrically connected to each one of the plurality of, typically two (2) power lines L1, L2 reaching the input line connector 22, as shown in FIG. 2.

Typically, the controller unit 30 determines the actual total load current L as being the largest one of the current measured by the current sensors 34 of the different power lines L1, L2. The actual total load current L could also be a value (such as the sum) determined from the current measured on each one of the two power lines L1, L2.

According to the other embodiment 10', typically, the controller unit 30 includes a modulator unit 40 electrically connected between the input line connector 22 and the load switch 28. The modulator unit 40 modulates (time modulation or pulsing or the like) a load charge power available to the EVSE 16 and reaching the output load connector 26 depending on the actual total load current L, such that the actual total load current L does not exceed the trip value T for more than typically the predetermined trip delay value TD, thereby ensuring the maximum power to the EVSE 16, up to the maximum load charge value MC.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and/or hereinafter claimed.

We claim:

1. A charge demand controller device for an electric vehicle for connecting between a main switch of a service utility box of a utility service provider and an electrical panel configured to handle a predetermined maximum amperage value, said device comprising:

a box unit for mounting on a surface and having an input line connector for electrical connection with the main switch, an output line connector for electrical connection with the electrical panel, and an output load connector for electrical connection with an electric vehicle supply equipment (EVSE) external load, the box unit electrically mounting between the main switch and the control panel, the output load connector electrically connecting to the input line connector via a load switch; and a controller unit mounting in the box unit and connecting to the input line connector and the output load connector, the controller unit constantly monitoring an actual total load current at the input line connector, and selectively operating the load switch upon the actual total load current being above or below a trip value being a predetermined safety ratio of the predetermined maximum amperage value;

the controller unit including a predetermined trip delay value, the controller unit switching off the load switch upon the actual total load current remaining above the trip value for a trip time duration being equal to or larger than the predetermined trip delay value;

the controller unit further including a predetermined off delay value and a predetermined maximum amperage load charge value of the device, the controller unit switching back on the load switch upon the actual total load current remaining below the trip value minus the predetermined maximum amperage load charge value for an actual off time duration being equal to or larger than the predetermined off delay value.

2. The device of claim 1, further including a switch contactor coil electrically connected to the controller unit and operatively connected to the load switch.

3. The device of claim 2, wherein the controller unit includes a modulator unit electrically connected between the input line connector and the load switch, the modulator unit modulating a load charge power reaching the output load connector depending on the actual total load current.

4. The device of claim 3, wherein the modulator unit ensures that the actual total load current does not exceed the trip value for more than a predetermined trip delay value.

5. The device of claim 1, wherein, while the actual off time duration is smaller than the predetermined off delay value and upon the actual total load current being equal or larger than the trip value minus the predetermined maximum amperage load charge value, the controller unit verifying that the actual total load current remains equal or larger than the trip value minus the predetermined maximum amperage load charge value for a trip time duration being equal to or larger than the predetermined trip delay value to allow turning back on the load switch, and, upon the actual total load current being less than the trip value minus the predetermined maximum amperage load charge value, to maintain the load switch off and resume comparing the actual off time duration with the predetermined off delay value until the actual off time duration is equal to or larger than the predetermined off delay value before allowing turning back on the load switch or maintaining the load switch off upon the actual total load current remaining below the trip value minus the predetermined maximum amperage load charge value for another actual off time duration being equal to or larger than the predetermined off delay value.

6. The device of claim 5, further including an input unit electrically connected to the controller unit, the input unit transmitting at least one operating value received from an operator to the controller unit, a first one of the at least one operating value being the predetermined maximum amperage value, a second one of the at least one operating value being the predetermined trip delay value, a third one of the at least one operating value being the predetermined maximum amperage load charge value, and a fourth one of the at least one operating value being the predetermined off delay value.

7. The device of claim 6, wherein a fifth one of the at least one operating value being the predetermined safety ratio.

8. The device of claim 1, wherein the controller unit includes at least one current sensor electrically connected to the input line connector to determine the actual total load current running through the input line connector.

9. The device of claim 8, wherein the input line connector connects to a plurality of power lines connecting to the main switch, the controller unit including one of the at least one current sensor electrically connected to each one of the plurality of power lines.

10. The device of claim 9, wherein the controller unit determines the actual total load current being the largest one of the current measured by the at least one current sensor.

11. The device of claim 10, wherein the predetermined safety ratio is 80% of the predetermined maximum amperage value.

12. The device of claim 1, wherein the controller unit automatically turns off the load switch upon the actual total load current being larger than a load upper limit below the predetermined maximum amperage value.

13. The device of claim 12, wherein the load upper limit is 90% of the predetermined maximum amperage value.

* * * * *